US011429287B2

(12) United States Patent
Wu et al.

(10) Patent No.: US 11,429,287 B2
(45) Date of Patent: Aug. 30, 2022

(54) METHOD, ELECTRONIC DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Andy Ling Wu, Shanghai (CN); Roland Fei Sun, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 58 days.

(21) Appl. No.: 17/121,643

(22) Filed: Dec. 14, 2020

(65) Prior Publication Data

US 2022/0137833 A1    May 5, 2022

(30) Foreign Application Priority Data

Oct. 30, 2020   (CN) .......................... 202011189490.6

(51) Int. Cl.
*G06F 3/00*   (2006.01)
*G06F 3/06*   (2006.01)
*G06F 11/14*  (2006.01)

(52) U.S. Cl.
CPC ............ *G06F 3/0619* (2013.01); *G06F 3/064* (2013.01); *G06F 3/067* (2013.01); *G06F 3/0629* (2013.01); *G06F 3/0683* (2013.01); *G06F 11/1489* (2013.01)

(58) Field of Classification Search
None
See application file for complete search history.

(56) References Cited

U.S. PATENT DOCUMENTS 10,496,481 B2 *  12/2019  Han ................... G06F 11/1076
2005/0182892 A1 *  8/2005  Nakanishi ........... G06F 11/1435
                                                        711/170

(Continued)

OTHER PUBLICATIONS

S. Narayan and J. A. Chandy, "Extendable storage framework for reliable clustered storage systems," 2010 IEEE International Symposium on Parallel & Distributed Processing, Workshops and Phd Forum (IPDPSW), 2010, pp. 1-4, doi: 10.1109/IPDPSW.2010.5470801. (Year: 2010).*

(Continued)

*Primary Examiner* — Daniel F. McMahon
(74) *Attorney, Agent, or Firm* — Amin, Turocy & Watson, LLP

(57) ABSTRACT

Provided herein is a method, an electronic device, and a computer program product for managing a storage system. A method can comprise, in response to determining that a first storage unit of a storage system is faulty, writing, by a system comprising a processor, a data block stored in the first storage unit into a hidden file of the storage system. The hidden file can be distributed across at least a second storage unit and a third storage unit of the storage system, wherein the second storage unit and the third storage unit are different from the first storage unit. Writing the data block can comprise creating the hidden file in the storage system, and creating an index information item corresponding to the data block for the hidden file, which index information item indicates a physical address of the data block.

20 Claims, 9 Drawing Sheets

(56) References Cited

U.S. PATENT DOCUMENTS

| | | | | |
|---|---|---|---|---|
| 2012/0254565 | A1* | 10/2012 | Mitra | G06F 16/113 |
| | | | | 711/E12.001 |
| 2013/0166828 | A1* | 6/2013 | Chun | G06F 12/0253 |
| | | | | 711/170 |
| 2017/0017413 | A1* | 1/2017 | Aston | G06F 3/0643 |
| 2017/0068477 | A1* | 3/2017 | Yu | G06F 21/6218 |
| 2017/0337212 | A1* | 11/2017 | Hayasaka | G06F 3/064 |
| 2018/0275887 | A1* | 9/2018 | Yang | G06F 12/1009 |
| 2019/0243563 | A1* | 8/2019 | Suzuki | G06F 3/0604 |
| 2020/0042399 | A1* | 2/2020 | Kuang | G06F 11/1435 |
| 2020/0372001 | A1* | 11/2020 | Hirose | G06F 16/1748 |
| 2021/0303523 | A1* | 9/2021 | Periyagaram | G06F 3/0607 |
| 2021/0397711 | A1* | 12/2021 | Karr | G06F 11/108 |

OTHER PUBLICATIONS

L. Zeng, S. Chen, Q. Wei and D. Feng, "SeDas: A self-destructing data system based on active storage framework," 2012 Digest APMRC, 2012, pp. 1-8. (Year: 2012).*

* cited by examiner

METHOD, ELECTRONIC DEVICE, AND COMPUTER PROGRAM PRODUCT FOR MANAGING STORAGE SYSTEM

RELATED APPLICATION

The present application claims the benefit of priority to Chinese Patent Application No. 202011189490.6, filed on Oct. 30, 2020, which application is hereby incorporated into the present application by reference herein in its entirety.

TECHNICAL FIELD

Embodiments of the present disclosure generally relate to the field of data storage, and in particular, to a method, an electronic device, and a computer program product for managing a storage system.

BACKGROUND

In a storage system, there are usually one or more storage units to provide data storage capabilities. For example, the storage system may include one or more nodes, and each node may include one or more disks. Storage units may be one or more disks or one or more nodes in the storage system. When a storage unit is faulty, for example, when a disk on a node is faulty, data stored on the faulty disk needs to be reconstructed and the reconstructed data needs to be stored in other storage units in the storage system to ensure that all data in the storage system can be protected.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The embodiments of the present disclosure provide a method, an electronic device, and a computer program product for managing a storage system.

In a first aspect of the present disclosure, a method for managing a storage system is provided. The method includes: if it is determined that a first storage unit of the storage system is faulty, writing a data block stored in the first storage unit into a hidden file of the storage system, wherein the hidden file is distributed across at least a second storage unit and a third storage unit of the storage system, and the second storage unit and the third storage unit are different from the first storage unit.

In a second aspect of the present disclosure, an electronic device is provided. The electronic device includes at least one processing unit and at least one memory. The at least one memory is coupled to the at least one processing unit and stores instructions for execution by the at least one processing unit. The instruction, when executed by the at least one processing unit, causes the electronic device to perform actions including: if it is determined that a first storage unit of the storage system is faulty, writing a data block stored in the first storage unit into a hidden file of the storage system, wherein the hidden file is distributed across at least a second storage unit and a third storage unit of the storage system, and the second storage unit and the third storage unit are different from the first storage unit.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

The same or corresponding reference numerals in the various drawings represent the same or corresponding portions.

DETAILED DESCRIPTION

Figure 1:
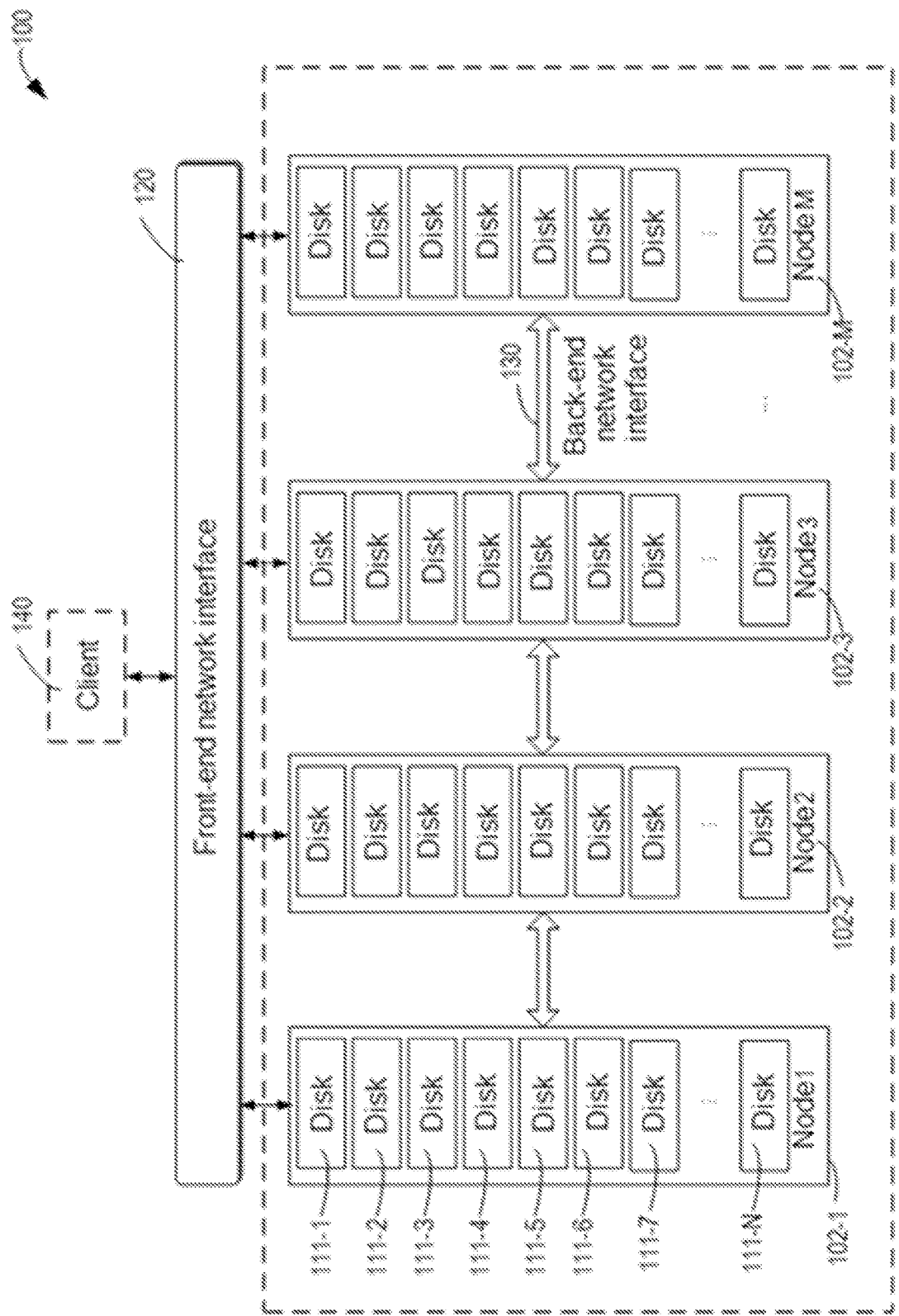
FIG. 1 shows a block diagram of an example environment in which embodiments of the present disclosure can be implemented.

Hereinafter, preferred embodiments of the present disclosure will be described in more detail with reference to the accompanying drawings. Although the preferred embodiments of the present disclosure are shown in the drawings, it should be understood that the present disclosure can be implemented in various forms and should not be limited by the embodiments set forth herein. Rather, these embodiments are provided so that the present disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like may refer to different or identical objects. Other explicit and implicit definitions may also be included below.

FIG. 1 shows a schematic diagram of storage system 100 in which embodiments of the present disclosure may be implemented. Storage system 100 includes one or more storage units for providing a data storage capability. In some embodiments, storage system 100 may include nodes 102-1, 102-2, 102-3, ..., 102-M (collectively or individually referred to as "node 102"). Each node 102 may include one or more disks. For example, node 102-1 may include disks 111-1, 111-2, ..., 111-N (collectively or individually referred to as "disk 111"). The storage units may be one or more disks 111 or one or more nodes 102 in storage system 100.

Storage system 100 shown in FIG. 1 has M nodes, and each node has N disks, where M and N may be any natural numbers. For example, M may be 4 and N may be 9, but this is only illustrative and does not limit the present disclosure in any way. It should be understood that the number of nodes may be arbitrary, the number of disks on nodes may be arbitrary, and the number of disks on different nodes may be different.

In some embodiments, disks in storage system 100 are also divided into different disk groups. For example, in FIG. 1, disk 111-2, disk 111-5, and disk 111-8 on node 102-1 and disks with corresponding serial numbers on nodes 102-2, 102-3, ..., 102-M are divided into a first disk group, and other disks remaining in storage system 100 are divided into other disk groups in a similar manner. It should be understood that the manner of grouping disks may be arbitrary, and the disks in storage system 100 may be divided into different disk groups in different ways.

Storage system 100 may utilize multiple storage technologies to provide data storage capabilities. In some embodiments, examples of disks may include, but are not limited to, a digital versatile disk (DVD), a Blue-ray disc (BD), an optical disk (CD), a floppy disk, a hard disk device, a tape drive, an optical drive, a hard disk drive (HDD), a solid storage device (SSD), a redundant array of independent disks (RAID), or other hard disk devices.

Storage system 100 also includes front-end network interface 120 to provide communication between one or more nodes 102 and one or more clients 140. Front-end network interface 120 may use multiple communication protocols. Storage system 100 also includes back-end network interface 130 to provide communication between one or more nodes 102-1, 102-2, 102-3, ..., 102-M for internal data transmission.

During the use of storage system 100, a storage unit of storage system 100 may be faulty. For example, a disk on node 102 is faulty. When a storage unit is faulty, in order to ensure that all data stored in the storage system can be protected, it is necessary to reconstruct data stored in the faulty storage unit and store the reconstructed data in other storage units in storage system 100.

Figure 2:
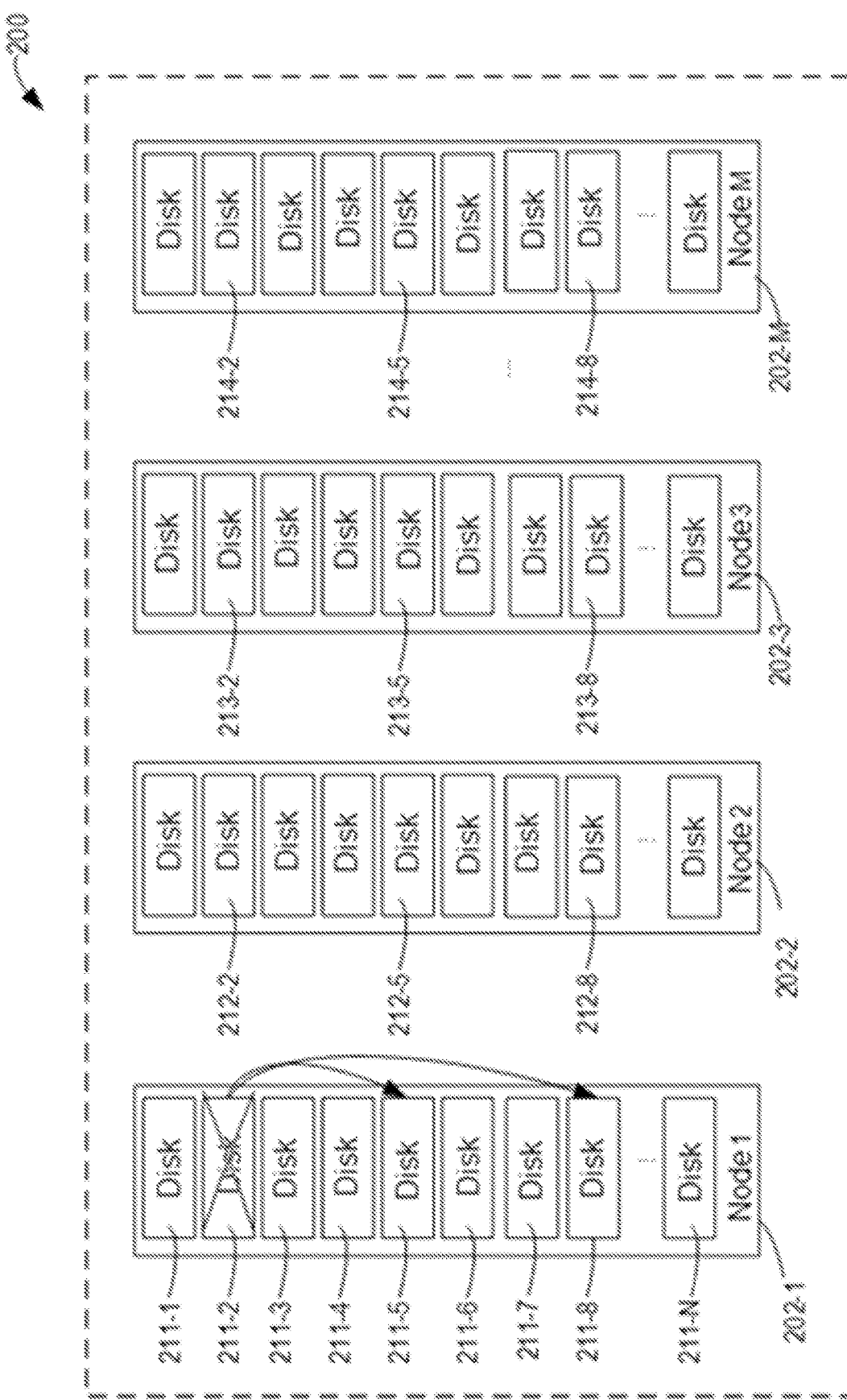
FIG. 2 shows a schematic diagram of a conventional solution for storing data stored in a faulty storage unit.

FIG. 2 shows a conventional solution for reconstructing and storing data in a faulty storage unit. As shown in FIG. 2, storage system 200 has a plurality of nodes 202-1, 202-2, 202-3, ..., 202-M (collectively or individually referred to as "node 202"). Each node 202 may include one or more disks. For example, node 202-1 may include disks 211-1, 211-2, ..., 211-N (collectively or individually referred to as "disk 211"). Disks in storage system 200 are also divided into different disk groups. For example, disk 211-2, disk 211-5, and disk 211-8 on node 202-1 in storage system 200 and disks 212-2, 212-5, 212-8, 213-2, 213-5, 213-8, 214-2, 214-5, and 214-8 as shown in FIG. 2 on nodes 202-2, 202-3, ..., 202-M are divided into a first disk group, and other disks remaining in storage system 200 are divided into other disk groups in a similar manner.

When a storage unit in storage system 200 is faulty, for example, as shown in FIG. 2, when disk 211-2 on node 202-1 is faulty, in a conventional solution, in order to ensure that data stored in faulty disk 211-2 can be protected, storage system 200 reconstructs the data stored in faulty disk 211-2, and stores the reconstructed data on disks that are at the same node 202-1 and in the same disk group as faulty disk 211-2, rather than storing the data in other storage units of storage system 200. The reason for such processing according to the conventional solution is that in storage system 200, technologies such as erasure coding or mirroring are usually used to protect data. Through such protection methods, when disk 211-2 on node 202-1 is faulty, the data on node 202 other than node 202-1 may be used to reconstruct the data of disk 211-2 on node 202-1. Therefore, if the data of faulty disk 211-2 is reconstructed and then stored to a node other than node 202-1, such as node 202-2, once node 202-2 is faulty, the data of two nodes 202 will actually be lost (that is, the data of reconstructed node 202-1 stored on node 202-2 and the original data of node 202-2), which will cause the original erasure coding or mirroring protection to fail to obtain enough data blocks to reconstruct the original data. Therefore, in the conventional solution, the reconstructed data is stored on a disk that is at the same node 202-1 and in the same disk group as faulty disk 211-2, and the data is not stored in other storage units of storage system 200. That is, as shown in FIG. 2, the data in faulty disk 211-2 is reconstructed and stored in disk 211-5 and disk 211-8, and the data in faulty disk 211-2 will not be stored in other storage units of storage system 200.

In the conventional solution, when the amount of data stored in faulty disk 211-2 is very large, a very large amount of reconstructed data needs to be stored in disk 211-5 and disk 211-8, that is, a large number of write I/O operations are needed for disk 211-5 and disk 211-8, which will cause disk 211-5 and disk 211-8 to be very busy, will cause delays in workflows on disk 211-5 and disk 211-8, and will affect the performance of the entire storage system 200, especially seriously affect a delay-sensitive workflow. In addition, this conventional solution will also cause a large amount of data to be stored in disk 211-5 and disk 211-8, which will further cause an imbalance in the amount of data stored in each disk in storage system 200, and affect the performance of the entire storage system 200.

The embodiments of the present disclosure provide a solution for managing a storage system to solve one or more of the above problems and other potential problems. In this solution, if it is determined that a first storage unit in storage system 100 is faulty, a data block stored in the first storage unit is written into a hidden file in the storage system. The hidden file can be distributed across a plurality of other storage units different from the faulty first storage unit in the storage system. In this way, the data block stored in the first storage unit is reconstructed and stored in other storage units in storage system 100, thereby ensuring that the data can be protected.

In this way, this solution can avoid an excessively busy situation caused by too many data write I/O operations on a certain storage unit or certain storage units, which is beneficial to the performance of storage system 100, especially to the performance of a delay-sensitive workflow. In addition, this solution can balance the amount of data stored in each disk in storage system 100, thereby further optimizing the performance of the entire storage system.

In addition, this solution can re-store, after the faulty first storage unit is repaired or replaced, the data originally stored in the first storage unit to the repaired or replaced first storage unit.

Figure 3:
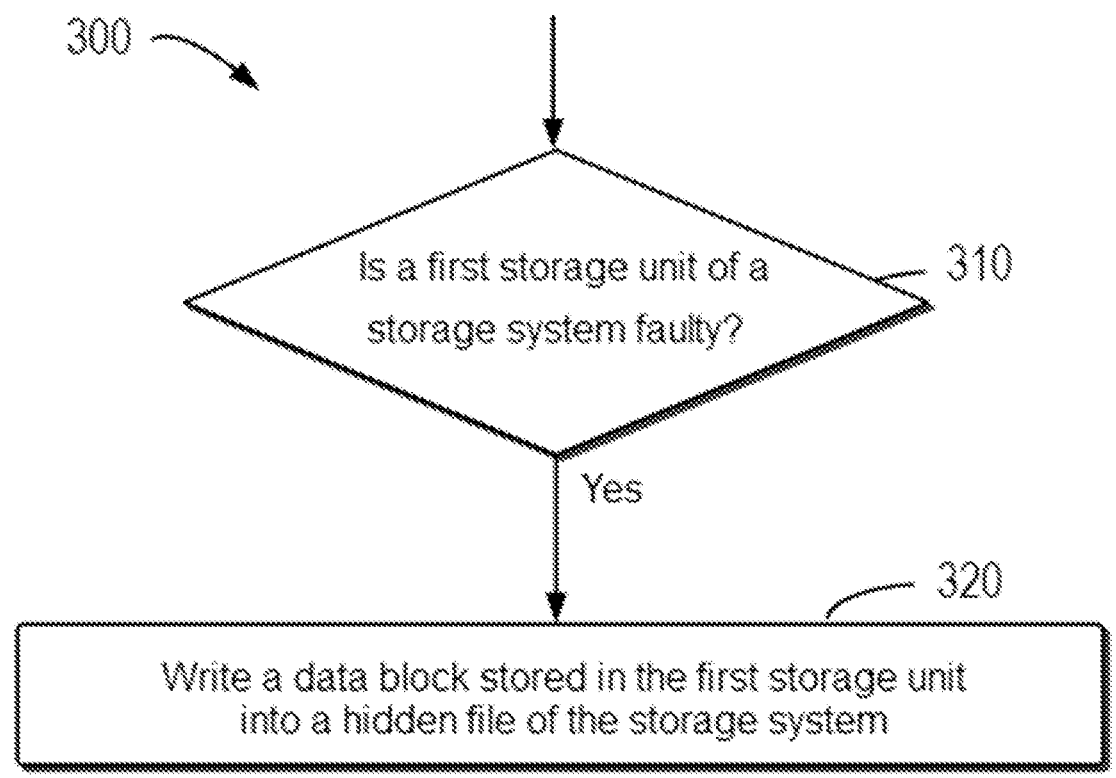
FIG. 3 shows a flowchart of an example method for storing data stored in a faulty storage unit according to an embodiment of the present disclosure.

The embodiments of the present disclosure will be described in detail below with reference to the accompanying drawings. FIG. 3 shows a flowchart of example method 300 for managing storage system 100 according to an embodiment of the present disclosure. Method 300 may be, for example, executed by storage system 100 as shown in FIG. 1. It should be understood that method 300 may further include an additional action that is not shown and/or may omit an action that is shown. The scope of the present disclosure is not limited in this regard. Method 300 is described in detail below with reference to FIG. 1.

As shown in FIG. 3, at 310, if it is determined that a first storage unit in storage system 100 is faulty, it means that a data block stored in the first storage unit needs to be stored for data protection.

Optionally, in some embodiments, the method further includes: reconstructing the data block stored in the first storage unit. For example, erasure code or mirror images in storage system 100 may be utilized to reconstruct the data block.

At 320, the data block stored in the first storage unit is written into a hidden file of storage system 100. The hidden file is a special type of files invisible to users in storage system 100. The hidden file can be distributed across a plurality of other storage units different from the faulty first storage unit in storage system 100. The hidden file in the storage system has many functions. For example, there may be a large amount of duplicate data in some files in the storage system. In order to avoid a large amount of duplicate data being repeatedly stored multiple times, the data may be stored in the hidden file once to avoid repeated occupations of a storage space. In addition, some files that are too small may also be combined together and stored in the hidden file.

In some embodiments, if there is no hidden file in storage system 100, a hidden file needs to be created and initialized.

In some embodiments, since the hidden file can be distributed across a plurality of other storage units different from the faulty first storage unit in storage system 100, the data block stored in the hidden file may be located in a plurality of storage units other than the faulty first storage unit in storage system 100. Therefore, storage system 100 may also automatically allocate the storage of each data block in the hidden file in storage system 100. In this way, the allocation of storage resources in storage system 100 can be better balanced, and the performance of storage system 100 can be further improved.

Figure 4:
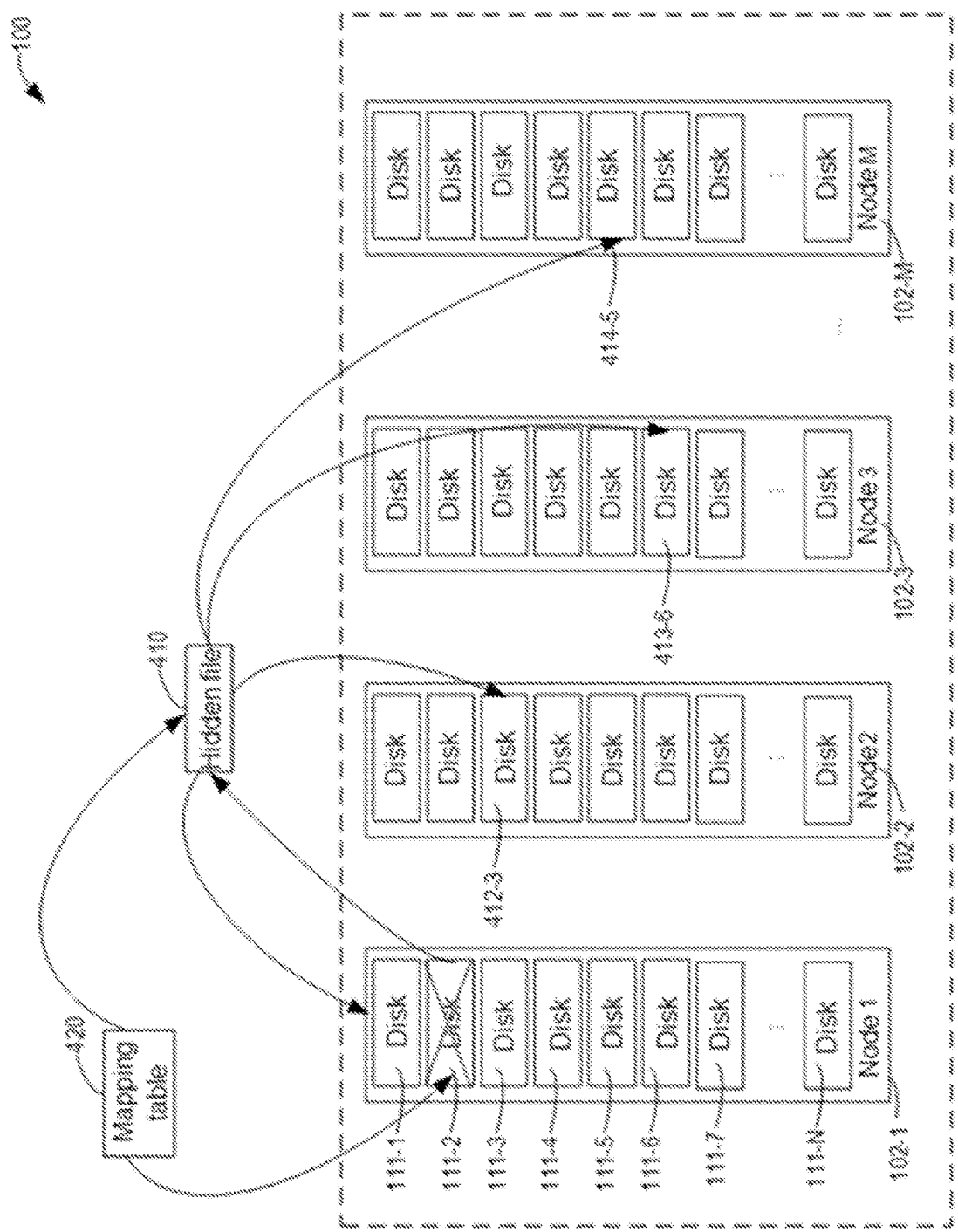
FIG. 4 shows a schematic diagram of an example method for storing data stored in a faulty storage unit according to an embodiment of the present disclosure.

FIG. 4 shows a schematic diagram of reconstructing and storing data stored in a faulty first storage unit according to an embodiment of the present disclosure. To facilitate discussion, FIG. 4 is described in conjunction with process 300 in FIG. 3. As shown in FIG. 4, storage system 100 may include a plurality of nodes 102, and each node 102 may include a plurality of disks. Storage system 100 also has hidden file 410 and mapping table 420. Although FIG. 4 shows one hidden file 410 and one mapping table 420, but this is only illustrative and is not intended to limit the scope of the present disclosure. It should be understood that storage system 100 may have a plurality of hidden files 410 and a plurality of mapping tables 420.

In some embodiments, when a certain storage unit in storage system 100 is faulty, for example, disk 111-2 (also referred to as the first storage unit for ease of discussion) on node 102-1 is faulty, the data block stored in disk 111-2 needs to be reconstructed and the reconstructed data block needs to be stored in hidden file 410. In some embodiments, storage system 100 may include a plurality of hidden files 410. The plurality of hidden files 410 may be used to store the above-mentioned reconstructed data block of the faulty first storage unit. In some embodiments, the reconstruction of the data block is performed using erasure code or mirror images stored in storage system 100. It should be understood that other modes may also be used to reconstruct the data block. In some embodiments, a first physical address of the data block stored in hidden file 410 in storage system 100 may be located at a certain physical address on a disk other than faulty disk 111-2 in storage system 100. For example, as shown in FIG. 4, the first physical address of the data block may be a certain physical address on disk 111-1 on node 102-1, or a certain physical address on disk 412-3 on node 102-2, or a certain physical address on disk 413-6 on node 102-3, or a certain physical address on disk 414-5 on node 102-M. Although FIG. 4 shows that the data block in hidden file 410 may be stored on, for example, disk 111-1, disk 412-3, disk 413-6, and disk 414-5, but this is only illustrative. It should be understood that the data block in hidden file 410 may be stored on any disk in storage system 100 other than faulty disk 111-2.

In some embodiments, when the data block is stored in hidden file 410, an index information item corresponding to the data block is also created for hidden file 410. The index information item indicates the first physical address of the data block written into hidden file 410.

In some embodiments, after the data block is stored in hidden file 410, an original physical address of the data block at a storage position of original faulty disk 111-2 (for ease of discussion, also referred to as a second physical address) is replaced with the index information item corresponding to the data block in hidden file 410. It will be described in detail below with reference to FIGS. 5 and 6.

In addition, FIG. 4 also shows mapping table 420 in storage system 100. After the data block is written into hidden file 410, mapping table 420 stores the index information items saved in hidden file 410 and an identifier of the faulty first storage unit in an associative manner. For example, the index information item saved in hidden file 410 and the identifier of faulty disk 111-2 are stored in an associative manner in the mapping table. The identifier of faulty disk 111-2 may be, for example, identification number 1 of node 102-1 in storage system 100 and serial number 2 of disk 111-2 on node 102-1.

Figure 5:
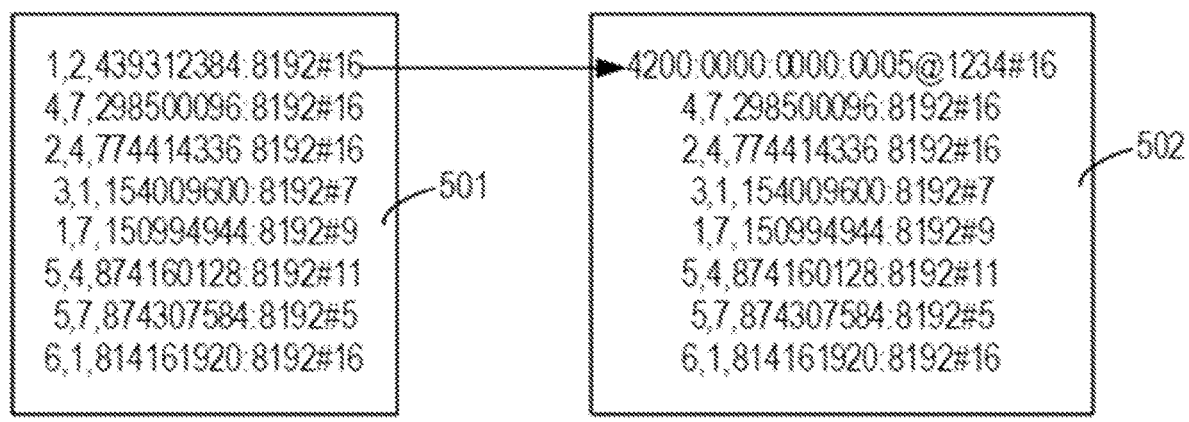
FIG. 5 shows a schematic diagram of an address translation of a data block according to an embodiment of the present disclosure.

FIG. 5 shows a schematic diagram of an address translation of a data block according to an embodiment of the present disclosure. As shown in FIG. 5, block 501 shows physical addresses of certain data blocks recorded in storage system 100 before disk 111-2 is faulty, and each row of information represents physical address information of a data block. For example, the first row 1,2,439312384: 8192#16 in block 501 represents a second physical address of the data block, where the number "1" before the first "," represents node 102-1 of the data block located in storage system 100, the number "2" between the two "," represents that the data block is located on disk 111-2 on node 102-1, and the following number string represents specific physical address offset information of the data block on disk 111-2 on node 102-1. When disk 111-2 on node 102-1 is faulty, the data block corresponding to the first row in block 501 needs to be stored in hidden file 410.

After the data block has been stored in hidden file 410, the corresponding second physical address in storage system 100 also changes. As shown in FIG. 5, block 502 shows an updated physical address stored in storage system 100 after the data block in faulty disk 111-2 has been stored in hidden file 410. As shown in FIG. 5, the first line of information in block 501 becomes the first line in block 502, that is, the second physical address of the data block becomes the first line of information in block 502. The first line of information in block 502 indicates the corresponding index information item, in hidden file 410, of the data block corresponding to the first line in block 501. Information before "@" indicates identification information of hidden file 410 to which the data block is written, and information after "@" indicates offset position information of the data block in hidden file 410 corresponding to the identifier. A more detailed description will be made below in conjunction with FIG. 7.

Figure 6:
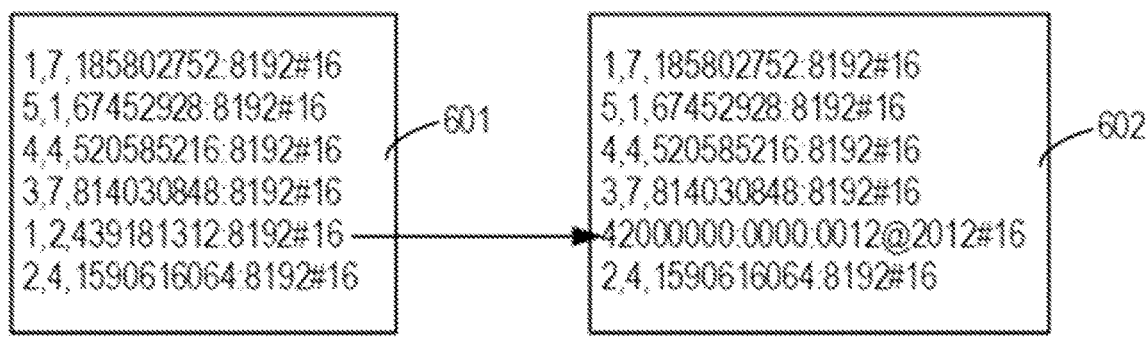
FIG. 6 shows a schematic diagram of an address translation of a redundant data block according to an embodiment of the present disclosure.

FIG. 6 shows a schematic diagram of an address translation of a redundant data block according to an embodiment of the present disclosure. In some embodiments, in order to better protect data, storage system 100 also provides redundancy protection for the data stored in each storage unit in storage system 100. Redundancy protection may adopt different redundancy protection modes, including but not limited to parity protection or mirroring protection. In the data process of reconstructing and storing the data block stored in the faulty first storage unit, a redundant data block stored in the faulty first storage unit is also reconstructed and stored in hidden file 410. For example, similar to FIG. 5, blocks 601 and 602 in FIG. 6 respectively show the translation of physical address information of certain redundant data blocks in storage system 100. The fifth row of block 601 and the fifth row of block 602 respectively show a second physical address of a redundant data block on disk 111-2 of node 102-1 before the fault occurs, and index information item corresponding to the redundant data block after being stored in hidden file 410.

In some embodiments, storage system 100 also provides redundancy protection for the data block stored in hidden file 410. For example, this may be achieved by adopting its own corresponding erasure code or mirror images. That is to say, the data block and the redundant data block stored in hidden file 410 are redundantly protected, which provides secondary redundancy protection for the data in the faulty first storage unit. In this way, the data can be protected with a protection level not lower than the original protection level of the stored faulty data block. Even if some data blocks stored in storage system 100 are accidentally damaged, storage system 100 can recover the data blocks through redundant blocks.

Figure 7:
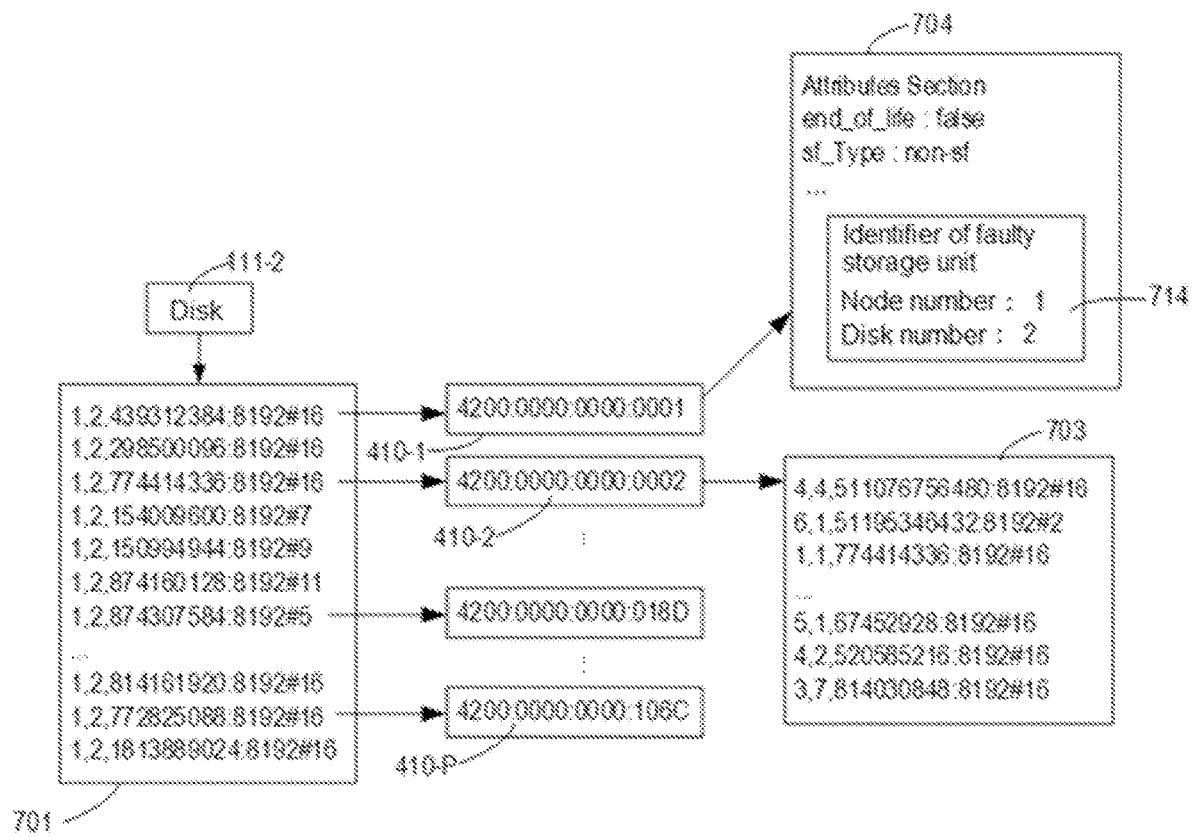
FIG. 7 shows a schematic diagram of storing data stored in a faulty storage unit into other storage units according to an embodiment of the present disclosure.

FIG. 7 shows a schematic diagram of storing a data block stored in a faulty first storage unit to hidden file 410 according to an embodiment of the present disclosure.

As shown in FIG. 7, block 701 shows second physical addresses of a plurality of data blocks stored in faulty disk 111-2 in disk 111-2. In some embodiments, storage system 100 may include a plurality of hidden files 410-1, 410-2, . . . , 410-P (collectively or individually referred to as "hidden file 410"). P may be any natural number. For example, P may be 16, but this is only illustrative and does not limit the present disclosure in any way. After disk 111-2 is faulty, a plurality of data blocks stored in 111-2 are stored in a certain hidden file 410. For example, a data block corresponding to the first row in block 701 is saved in hidden file 410-1, a data block corresponding to the third row in block 701 is saved in hidden file 410-2, and so on, a data block corresponding to the second last row in block 701 is saved in hidden file 410-P. Different hidden files 410 have identification information as shown in the text in hidden file 410 in the figure. It should be understood that each hidden file 410 may store a plurality of data blocks. The identification information of hidden file 410 shown in hidden file 410 combined with the offset position information of the data block in hidden file 410 may jointly form the index information item of the data block stored in hidden file 410 as shown in FIGS. 5 and 6.

Block 703 shows the information of address positions of the plurality of data blocks stored in hidden file 410-2 in storage system 100. It can be seen from block 703 that these data blocks are stored on a plurality of disks in storage system 100 other than faulty disk 111-2, such as a disk with a serial number of 4 on node 102-4 indicated by the first row.

Block 704 shows other attribute information stored in hidden file 410. Lower block 714 stores the identification information of faulty disk 111-2. For example, node number 1 shown in the figure may identify node 102-1, and disk number 2 may identify disk 111-2 on node 102-1.

Figure 8:
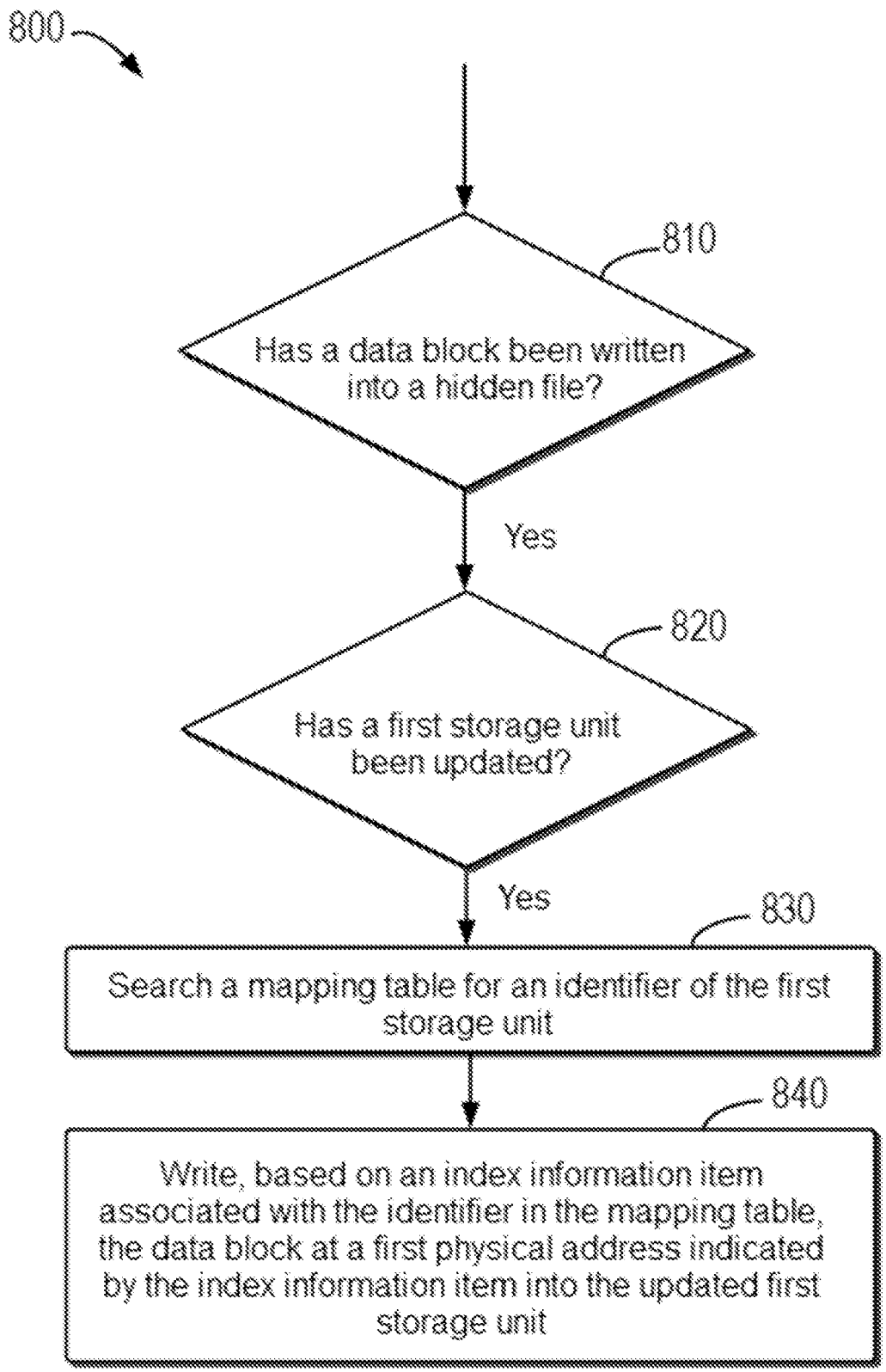
FIG. 8 shows a flowchart of an example method for storing data back to an updated original faulty storage unit according to another embodiment of the present disclosure.

FIG. 8 shows a flowchart of an example method for storing data back to an updated original faulty storage unit according to another embodiment of the present disclosure.

At 810, it is determined that a data block of a faulty first storage unit has been written into hidden file 410. If the data block has been written into hidden file 410, the data block has been protected by storage system 100. Then, the first storage unit may be updated.

In some embodiments, when the faulty first storage unit is updated, for example, the faulty first storage unit is repaired or the faulty first storage unit is replaced with a new first storage unit, the data block stored in the original first storage unit in hidden file 410 may be stored back to the updated first storage unit.

Returning to FIG. 8, at 820, it is determined that the faulty first storage unit has been updated. If the first storage unit has been updated, at 830, mapping table 420 in storage system 100 is searched for an identifier of the faulty first storage unit.

At 840, for the identifier of the faulty first storage unit, which is found in mapping table 420, an index information item associated with the identifier is acquired, a data block is acquired at a first physical address indicated by the index information item, and the data block is stored back to the updated original faulty storage unit.

Figure 9:
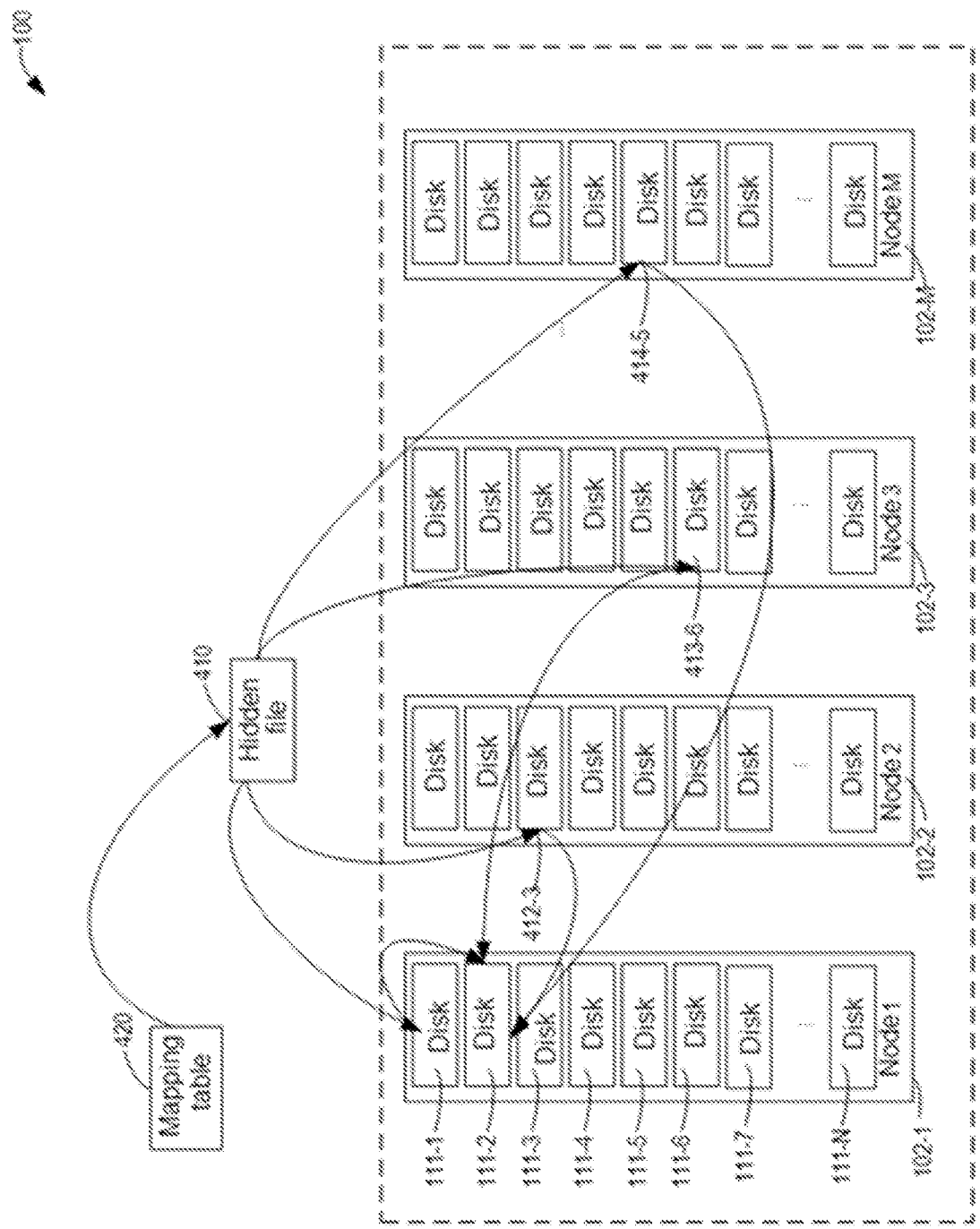
FIG. 9 shows a schematic diagram of an example method for storing data back to an updated original faulty storage unit according to another embodiment of the present disclosure.

FIG. 9 shows a schematic diagram of an example method for storing data back to an updated original first storage unit according to another embodiment of the present disclosure. To facilitate discussion, FIG. 9 is described in conjunction with process 800 in FIG. 8.

As shown in FIG. 9, disk 111-2 on node 102-1 has been updated.

In conjunction with FIG. 4, a data block in original faulty disk 111-2 is stored in hidden file 410, and a first physical address of the data block stored in hidden file 410 in storage system 100 may be a certain physical address on a disk other than faulty disk 111-2 in storage system 100, for example, as shown in FIG. 4, a certain physical address on disk 111-2 on node 102-1, or a certain physical address on disk 412-3 on node 102-2, or a certain physical address on disk 413-6 on node 102-3, or a certain physical address on disk 414-5 on node 102-M.

Returning to FIG. 9, mapping table 420 is searched for an identifier of disk 111-2 on node 102-1, an index information item associated with the identifier is acquired, and the index information item indicates, for example, as shown in FIG. 4, a certain physical address on disk 111-2 on node 102-1, or a certain physical address on disk 412-3 on node 102-2, or a certain physical address on disk 413-6 on node 102-3, or a certain physical address on disk 414-5 on node 102-M.

A data block is acquired at the first physical address indicated by the index information item, and the data block is stored back to updated disk 111-2, as indicated by the arrow in FIG. 9.

In this way, the data block stored in hidden file 410 may be stored back into the updated first storage unit, which avoids re-allocating and calculating storage resources by storage system 100, saves the calculation work of storage system 100, and is beneficial to the performance of storage system 100.

In some embodiments, if the faulty first storage unit has not been updated for a long time, during this period of time, a user may have made a large number of modifications to the data stored in storage system 100, and many pieces of data stored in the original first storage unit in hidden file 410 may have been deleted by the user. In this case, if the first storage unit is updated, the remaining data blocks stored in hidden file 410 will still be stored back into the updated first storage unit. In this case, since the data blocks stored back to the updated first storage unit are reduced a lot, the storage space allocation of each storage unit in storage system 100 may be unbalanced. Therefore, in some embodiments, storage system 100 also needs to perform additional automatic balancing calculations to balance the allocation of storage resources in storage system 100. In this way, the storage resource allocation of storage system 100 can be better balanced.

In some embodiments, during the process of storing the data blocks stored in hidden file 410 back into the updated first storage unit, a large number of data blocks need to be written into the first storage unit. In order to prevent the first storage unit from being too busy due to the overly large amount of data being written, which affects normal read and write I/O operations, it is necessary to set the first storage unit to a temporary pause state and stop other read and write I/O operations until the process of storing the data blocks back to the first storage unit ends, and after that, the first storage unit will be restored to normal use. In this way, it can be ensured that data in storage system 100 is better protected.

Figure 10:
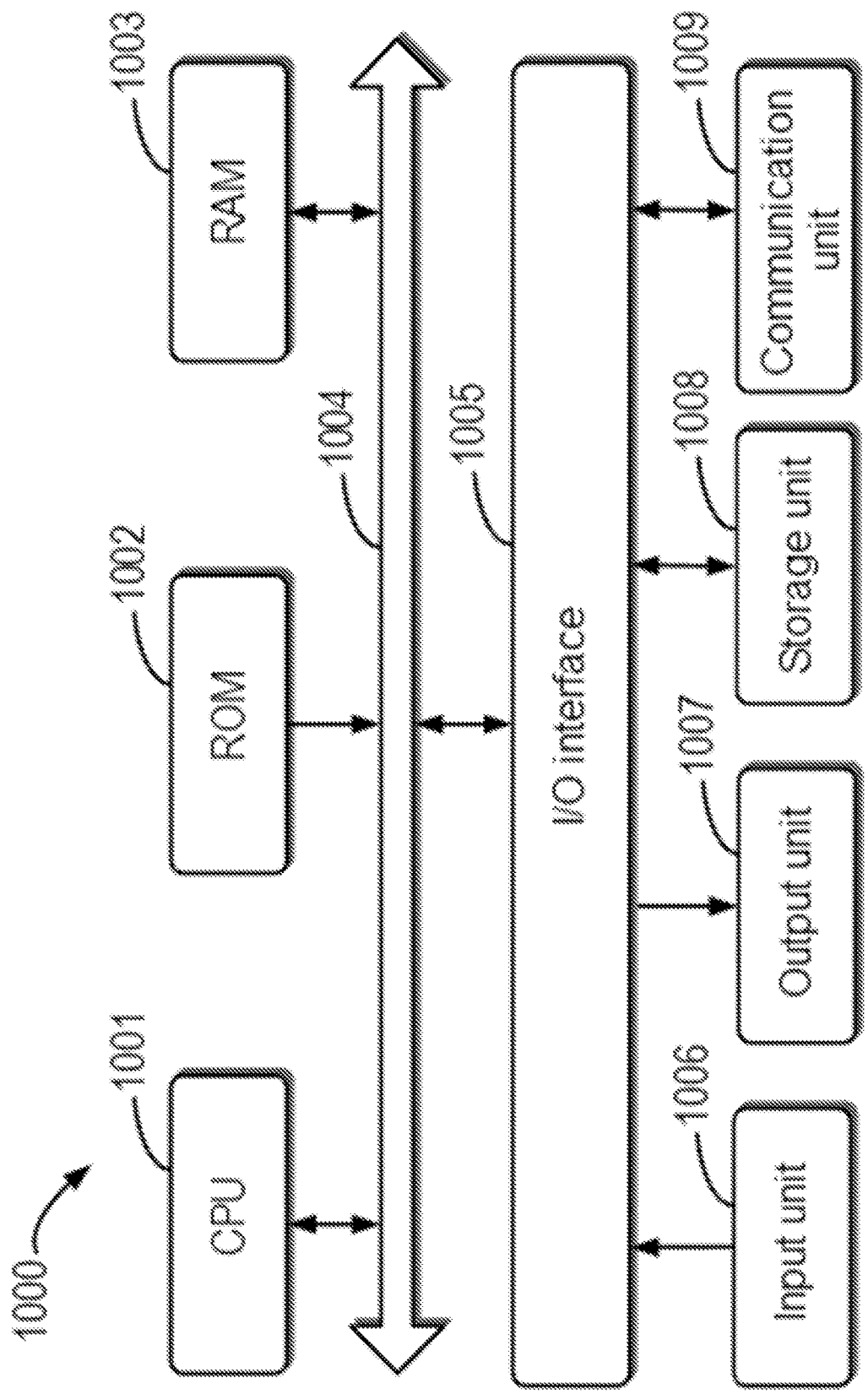
FIG. 10 shows a schematic block diagram of an example device that may be configured to implement embodiments of content of the present disclosure.

FIG. 10 shows a schematic block diagram of example device 1000 that may be configured to implement embodiments of content of the present disclosure. For example, storage system 100 as shown in FIG. 1 may be implemented by device 1000. As shown in FIG. 10, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of storage device 1000 may also be stored. CPU 1001, ROM 1002, and RAM 1003 are connected to each other via bus 1004. Input/output (I/O) interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a disk and an optical disc; and communication unit 1009, such as a network card, a modem, and a wireless communication transceiver. Communication unit 1009 allows device 1000 to exchange information/data with other devices over a computer network such as the Internet and/or various telecommunication networks.

The various processes and processing described above, such as methods 300 and/or 800, may be performed by processing unit 1001. For example, in some embodiments, methods 300 and/or 800 may be implemented as a computer software program that is tangibly included in a machine-readable medium, such as storage unit 1008. In some embodiments, some or all of the computer program may be loaded and/or installed onto device 1000 via ROM 1002 and/or communication unit 1009. One or more actions of methods 300 and/or 800 described above may be performed when the computer program is loaded into RAM 1003 and executed by CPU 1001.

The present disclosure may be a method, a device, a system, and/or a computer program product. The computer program product may include a computer-readable storage medium, on which computer-readable program instructions used for executing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer may be connected to a user's computer through any kind of network, including a local area network (LAN) or a wide area network (WAN), or it may be connected to an external computer (for example, connected through an Internet using an Internet service provider). In some embodiments, an electronic circuit, for example, a programmable logic circuit, a field programmable gate array (FPGA), or a programmable logic array (PLA), is personalized by utilizing the state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the device (system), and the computer program product according to embodiments of the present disclosure. It should be understood that each block in the flowcharts and/or block diagrams as well as a combination of blocks in the flowcharts and/or block diagrams may be implemented by using the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded onto a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, the program segment, or the part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of illustrated various embodiments. The selection of terms used herein is intended to best explain the principles and practical applications of the embodiments or the improvements to technologies on the market, or to enable other persons of ordinary skill in the art to understand the embodiments disclosed herein.

What is claimed is:

1. A method, comprising:
in response to determining that a first storage unit of a storage system is faulty, writing, by a system comprising a processor, a first data block stored in the first storage unit into a hidden file of the storage system, wherein the hidden file is distributed across at least a second storage unit and a third storage unit of the storage system; and
storing, for a data block at each of the second storage unit and the third storage unit, in an associative manner in a mapping table in the storage system, an identifier of the first storage unit and an index information item corresponding to the respective data block for the hidden file, wherein the index information item comprises identification information of the hidden file and offset position information of the data block in the hidden file at the respective second storage unit or third storage unit.

2. The method according to claim 1, wherein writing the first data block into the hidden file comprises:
creating the hidden file in the storage system, wherein each index information item further indicates a first physical address of the respective data block written into the hidden file in the storage system.

3. The method according to claim 1, further comprising:
in response to determining that the first data block has been written into the hidden file,
searching the mapping table for the identifier of the first storage unit in response to an updating of the first storage unit; and
writing, based on the index information item associated with the identifier in the mapping table, the first data block at the first physical address indicated by the index information item into the first storage unit.

4. The method according to claim 3, further comprising:
updating the first storage unit, wherein the updating comprises at least one of:
repairing the first storage unit, or
replacing the first storage unit.

5. The method according to claim 1, wherein writing the first data block stored in the first storage unit into the hidden file comprises:
   reconstructing the first data block stored in the first storage unit, resulting in a reconstructed first data block; and
   writing the reconstructed first data block into the hidden file.

6. The method according to claim 1, further comprising at least one of:
   writing a redundant data block of the first data block into the hidden file; or
   storing the identifier of the first storage unit in the hidden file.

7. The method according to claim 2, further comprising:
   after the first data block is written into the hidden file, replacing a second physical address of the first data block recorded in the storage system in the first storage unit with the index information item corresponding to the first data block.

8. A device, comprising:
   at least one processor; and
   at least one memory storing computer program instructions, the at least one memory and the computer program instructions being configured to cause, together with the at least one processor, the electronic device to perform operations, comprising:
   based on determining that a first storage unit of a storage system is faulty, writing a data block stored in the first storage unit into a hidden file of the storage system, wherein the hidden file is distributed across at least a second storage unit and a third storage unit of the storage system, and wherein the hidden file is invisible to storage users of the storage system; and
   storing, for a data block at each of the second storage unit and the third storage unit, in an associative manner in a mapping table in the storage system, an identifier of the first storage unit.

9. The device according to claim 8, wherein writing the data block into the hidden file comprises:
   creating the hidden file in the storage system; and
   creating an index information item corresponding to the data block for the hidden file, the index information item indicating a first physical address of the data block written into the hidden file in the storage system and offset position information of the data block in the hidden file at the respective second storage unit or third storage unit.

10. The device according to claim 8, wherein the operations further comprise:
    based on determining that the data block has been written into the hidden file,
    searching the mapping table for the identifier of the first storage unit in response to an updating of the first storage unit; and
    writing, based on the index information item associated with the identifier in the mapping table, the data block at the first physical address indicated by the index information item into the first storage unit.

11. The device according to claim 10, wherein operations further comprise:
    updating the first storage unit, wherein the updating comprises at least one of:
    repairing the first storage unit, or
    replacing the first storage unit.

12. The device according to claim 8, wherein writing the data block stored in the first storage unit into the hidden file comprises:
    reconstructing the data block stored in the first storage unit, resulting in a reconstructed data block; and
    writing the reconstructed data block into the hidden file.

13. The device according to claim 8, wherein the operations further comprise at least one of:
    writing a redundant data block of the data block into the hidden file; or
    storing the identifier of the first storage unit in the hidden file.

14. The device according to claim 9, wherein the operations further comprise:
    after the data block is written into the hidden file, replacing a second physical address of the data block recorded in the storage system in the first storage unit with the index information item corresponding to the data block.

15. A non-transitory computer program product stored in a non-volatile computer-readable medium and comprising machine-executable instructions that, when executed by a device, cause the device to execute operations, comprising:
    in response to determining that a first storage unit of a storage system is faulty, writing, by a system comprising a processor, a data block stored in the first storage unit into a hidden file of the storage system,
    wherein the hidden file is distributed across at least a second storage unit and a third storage unit of the storage system,
    storing, for a data block at each of the second storage unit and the third storage unit, in an associative manner in a mapping table in the storage system, an index information item corresponding to the respective data block for the hidden file, wherein the index information item comprises identification information of the hidden file and offset position information of the data block in the hidden file at the respective second storage unit or third storage unit.

16. The non-transitory computer program product according to claim 15, wherein writing the data block into the hidden file comprises:
    creating the hidden file in the storage system,
    wherein the index information item further indicates a first physical address of the data block written into the hidden file in the storage system.

17. The non-transitory computer program product according to claim 15, wherein writing the data block stored in the first storage unit into the hidden file comprises:
    reconstructing the data block stored in the first storage unit, resulting in a reconstructed data block; and
    writing the reconstructed data block into the hidden file.

18. The non-transitory computer program product according to claim 15, wherein the operations further comprise at least one of:
    writing a redundant data block of the data block into the hidden file; or
    storing an identifier of the first storage unit in the hidden file.

19. The method according to claim 5, further comprising:
    after reconstructing the first data block stored in the first storage unit, balancing allocation of storage resources of the first storage unit.

20. The method according to claim 5, further comprising:
prior to reconstructing the first data block stored in the first storage unit, setting the first storage unit to a pause state to stop other read and write operations to the first storage unit.

\* \* \* \* \*